United States Patent [19]
Reznik

[11] Patent Number: 4,972,965
[45] Date of Patent: Nov. 27, 1990

[54] PROTECTIVE DEVICE FOR GAS PRESSURE VESSELS

[75] Inventor: Israel Reznik, Zollikon, Switzerland

[73] Assignee: Swiss Aluminium Ltd., Chippis, Switzerland

[21] Appl. No.: 369,956

[22] Filed: Jun. 22, 1989

[30] Foreign Application Priority Data

Mar. 14, 1989 [CH] Switzerland .................. 939/89

[51] Int. Cl.$^5$ .......................................... F16K 17/196
[52] U.S. Cl. ................................................. 220/201
[58] Field of Search ............... 220/201; 137/72, 73, 137/468

[56] References Cited

U.S. PATENT DOCUMENTS

| | | | |
|---|---|---|---|
| 1,678,605 | 7/1928 | Scott et al. | 220/201 |
| 4,313,453 | 2/1982 | Holmes | 220/201 |
| 4,457,327 | 7/1984 | Pepper | 220/201 |
| 4,458,711 | 7/1984 | Flider | 220/201 |

FOREIGN PATENT DOCUMENTS 2210441  6/1989  United Kingdom .............. 220/201

*Primary Examiner*—Joseph Man-Fu Moy
*Attorney, Agent, or Firm*—Bachman & LaPointe

[57] ABSTRACT

The protective device against an overheating, in particular by fire, of individual or batteries of pressure vessels (10) of a length (1) of at least 1.5 m serves for the storage and/or transportation of high- pressure gases. The pressure vessels (10) have at least one end cap (14) with a valve (18) or an end plug (20) with a melting plug (22) of an alloy melting at a low temperature. On at least one end cap (14) a pressure pipe (24), communicating constantly with the interior of a pressure vessel (10) branches off, which pressure pipe is led in axial direction (A) along at least a part of the pressure vessel (10). At intervals (a), essentially T-shaped fittings (26) are installed in the pressure pipe (24), which fittings have in their branching-off leg a melting plug (22) of an alloy melting at a low temperature. A blindly ending pressure pipe (24) is closed off by such a melting plug (22). The protective device is primarily used on pressure vessels of aluminium, in particular with a fibre-reinforced jacketing (12).

15 Claims, 3 Drawing Sheets

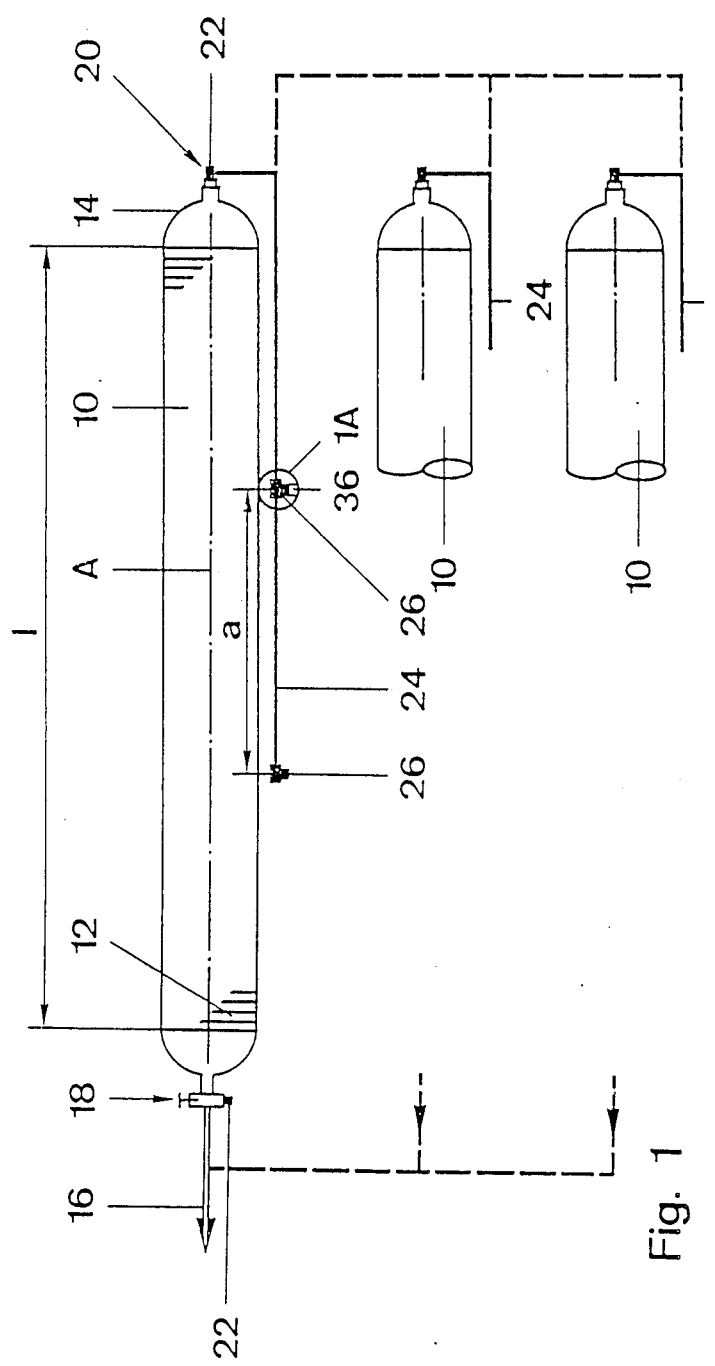
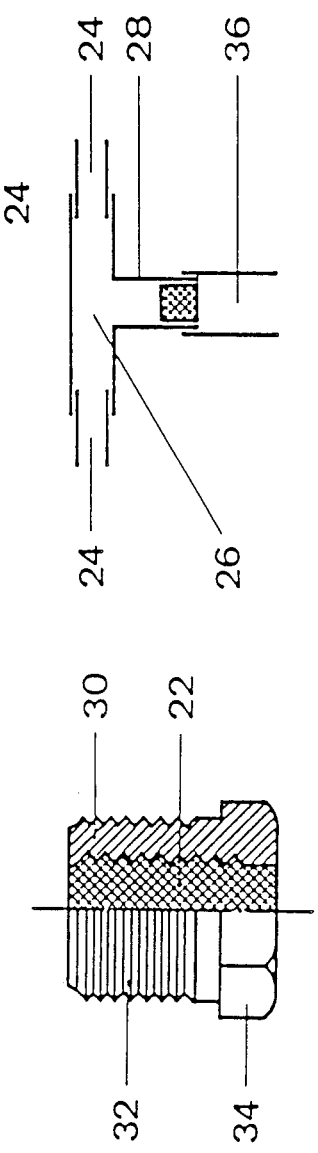
Fig. 1
Fig. 1A
Fig. 2

PROTECTIVE DEVICE FOR GAS PRESSURE VESSELS

The invention relates to a protective device against overheating, in particular by fire, of individual or batteries of, pressure vessels of a length of at least 1.5 m, for the storage and/or transportation of high-pressure gases, which essentially cylindrical pressure vessel or vessels has or have at least one end cap with a valve or an end plug with a melting plug of an alloy melting at a low temperature. Furthermore, the invention relates to the use of the protective device for specific gas pressure vessels.

Pressure vessels have long since been protected against overpressure produced by heat development. This takes place for example by the installation of a rupture disc of known design, which ruptures in the event of a critical pressure and allows the gas to escape.

Furthermore, it is also known to replace a rupture disc by a melting plug of an alloy melting at a low temperature. Alloys can be produced which have a melting point below the solidification point of the individual components. These alloys are referred to as Wood's metal.

If the temperature increases due to general or local overheating in the area of the melting plug to a predetermined temperature, dependent on the alloy composition, the metal melts and the gas can escape from the pressure vessel. Usually, alloys having a melting point of 80–120° C. are used for melting plugs.

For the storage and transportation of gases in cylindrical pressure vessels with high internal pressure, recently very large gas cylinders of diameters up to approximately 600 mm, in particular 550 mm, and lengths of 6 or even 12–13 m have also been produced. These large pressure vessels, when filled in practice, have an operating pressure of over 200 bar.

Large pressure vessels of steel have the disadvantage that they have a very high empty weight. Therefore, due to their lower weight, pressure vessels of aluminium are used in particular for transportation. As described in DE-C2 3103646, pressure vessels of aluminium can also be produced with reduced wall thickness. The areas of reduced wall thickness must, however, be fibre-reinforced, for example by glass fibres bound in a flame retardant polymer matrix.

Large pressure vessels of the said type have end caps at both ends, on to which a valve or an end plug can be connected in each case. If a melting plug is integrated, it melts as soon as a temperature in the range of approximately 100° C. is exceeded, and flows out. Thereafter, the gas stored in the pressure vessel can escape without any appreciable resistance.

What is unsatisfactory is the fact that an outbreak of fire or other local heating in the middle area of a large pressure vessel can cause a damaging effect before at least one of the end melting plugs has melted and the gas of the pressure vessel can escape. The heat development in the middle area can progress to the extent that the pressure vessel may already burst before the opening of the melting plugs, even if it has already been emptied to a great extent. This danger exists primarily in the case of pressure vessels of aluminium.

The inventor has set himself the object of creating a protective device for a pressure vessel or a battery of pressure vessels of the type mentioned at the beginning which reduces to a negligible minimum the risks of overheating, in particular of the effect of a fire, irrespective of the length, the diameter and the filling pressure of a cylindrical pressure vessel. The protective device is to be inexpensive in production, simple in its operation and of enhanced safety. Furthermore, the protective device mentioned is to be suitable for universal use.

According to the invention, the object is achieved with respective to the device by the fact that a pressure pipe, always communicating with the interior of the pressure vessel, branches off at at least one end cap and is taken in axial direction along at least part of the pressure vessel, essentially T-shaped fittings are installed into the pressure pipe at intervals, which fittings have in their branching-off leg a melting plug of an alloy melting at a low temperature and/or a blindly ending pressure pipe is closed off by such a melting plug.

The alloy of the melting plug, known per se but according to the invention additionally arranged in a pressure pipe, preferably melts in a range of approximately 80–120° C., in particular at approximately 100° C. The melting temperature must not be too low, as otherwise the metal could melt without a dangerous situation existing, for example due to intensive sunlight in southern countries. On the other hand, the melting temperature must not be too high, because otherwise a damaging effect cannot be ruled out with adequate certainty.

The melting plugs arranged along a pressure pipe preferably have an interval of 1–2 m, in particular of 1.5 m.

The arrangement of the pressure pipe or of the pressure pipes for a pressure vessel may, according to a first variant, be such that one pressure pipe extends, starting from one end cap, into the area of the other end cap. The spacing of the last, end-fitted melting plug of the pressure pipe has from the end cap of the pressure vessel at most a length which corresponds to the spacing of two melting plugs.

According to a second variant, there extends from each end cap of a pressure vessel a pressure pipe in the direction of the other end cap, parallel to the longitudinal axis of the pressure vessel. The two face ends of the pressure pipes with a pressure plug have in turn a spacing which corresponds approximately to the spacing of two melting plugs of one pressure pipe. The two pressure pipes according to the second variant may be of different lengths or of the same length.

According to a third, preferred variant, the same pressure pipe is connected to both the end caps of a pressure vessel, and thus forms a ring closure.

If a pressure vessel contains a gas under high-pressure which does not react when exposed to fire, such as for example helium, argon, nitrogen or carbon dioxide, in the event of damage occurring, with plug melted it can be passed directly from the fitting to the outside or directly into the fire and so possibly achieve a certain extinguishing effect.

In the case of combustible gases which fuel the fire, such as for example natural gas, town gas, oxygen, methane or hydrogen, the gas escaping when the plug melts must obviously not be discharged directly. Therefore, an opening closed off by a melting plug preferably opens into a vent pipe, which receives escaping gases and allows them to be discharged into the atmosphere outside the area of the pressure vessel or pressure vessels, for example above the roof of a tube trailer or outside a room with a battery of pressure vessels. Both in the case of one pressure vessel and in the case of batteries of pressure vessels, the vent pipes may be led out individually from the danger zone. However, it is usually more economical and technically easier to combine the vent pipes all together or in groups into a common pipe and to lead it outside the danger zone.

If a plurality of pressure vessels are combined in a rack for the storage or for the transportation of gases, for example three by three or four by three pressure vessels, one refers to a battery of pressure vessels. In this case, each pressure vessel may have one or two pressure pipes. A plurality of pressure vessels may also have a common pressure pipe, which may expediently have a correspondingly larger nominal width.

Depending on the gas volumes which may have to be vented, the diameter of pressure pipes is preferably in the range of 5–15 mm. The cross-section of the melting plugs preferably corresponds approximately to the inner cross-section of the pressure pipes.

In the case of a battery of pressure vessels, all arranged pressure pipes are preferably connected to one another in a communicating manner. After the melting of the first plug in the event of damage with local heat development, the pressure vessels begin to empty evenly. As the heat becomes more intense, further plugs melt continuously. Consequently, more gas can be discharged through the openings becoming free, but the pressure vessels are emptied to the same extent, because all communicate via the connected pressure pipes.

In the case of individual pressure vessels, pressure pipes are expediently arranged underneath the cylinder, in the case of a battery of pressure vessels they are expediently arranged in the area between the vessels. This thus ensures that the melting plugs respond as quickly as possible in the event of dangers arising.

Pressure pipes not only have to withstand the same pressure as the pressure vessels, they must also maintain their strength at an elevated temperature. Therefore, steel, copper and brass primarily come into consideration as material for the pressure pipes. The same materials are preferred for the vent pipes and fittings.

The main area of use of the protective device according to the invention is for pressure vessels of aluminium, in particular with a fibre-reinforced jacketing.

Standardized pressure vessels for natural gas, such as are used in particular in English-speaking regions, have a length of approximately 6 m (20 ft.) and a diameter of approximately 550 mm. Full pressure vessels have an operating pressure of approximately 210 bar (3000 psi).

The transportation of the pressure vessels is performed in so-called tube trailers, which are loaded with a battery of pressure vessels.

The mayor advantage of the protective device of individual or batteries of pressure vessels according to the invention is that a local overheating, in particular by fire, can occur anywhere along the pressure vessels even in the middle area thereof. Within a short time, the nearest melting plug already melts at approximately 100° C. and allows the gas to escape, under any pressure conditions whatsoever, and to eliminate a pressure built up by the heating before a bursting of the pressure vessel can take place. The protective device thus functions independently of the filling level of the pressure vessel.

The invention is explained in more detail with reference to the exemplary embodiments represented in the accompanying drawings, in which:

FIG. 1 shows a view of a cylindrical pressure vessel with a protective device;

FIG. 1A shows a detail of FIG. 1;

FIG. 2 shows a longitudinal section through a melting plug known per se;

Figure 3:
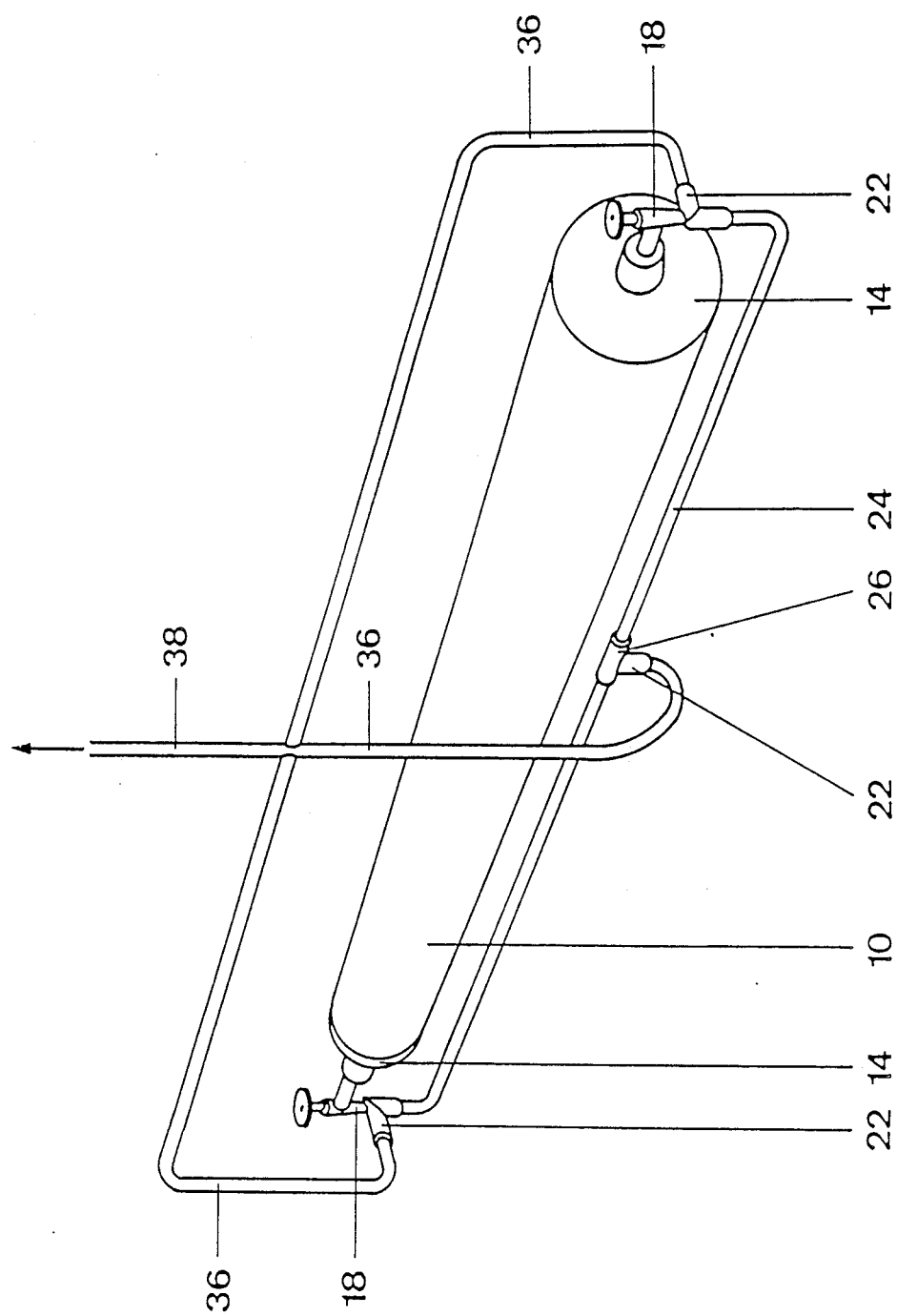
FIG. 3 shows a perspective view of a cylindrical pressure vessel with an annular protective device.

The cylindrical pressure vessel 10 represented in FIG. 1 serves for the storage and/or transportation of a high-pressure gas. The vessel consisting of aluminium, is reinforced with glass fibres 12 and is provided at both ends with a calotte-like end cap 14. A valve 18 is provided for an outflow line 16, and on the other side of the pressure vessel 10 an end plug 20 is provided.

A full pressure vessel 10 has an operating pressure up to approximately 210 bar. The pressure vessels 10 were tested without the effect of heat at a pressure of approximately 600 bar, all rupture tests having a positive outcome.

Both the valve 18 and the end plug 20 each have a melting plug 22 of an alloy melting at approximately 100° C.

If a fire were to occur in the middle area of the pressure vessel 10, having a length 1 of approximately 6 m, without the protective device according to the invention, the vessel wall of aluminium would lose strength at approximately 200° C. The two end melting plugs would not allow any gas to escape because they would not reach the melting point due to the fire only acting in the middle. As a result, the pressure vessel 10 could rupture, even if it were substantially emptied.

According to FIG. 1, a pressure pipe 24 branches from the end plug 20 and runs in axial direction A along the cylindrical pressure vessel 10. At about one third of the length 1, corresponding to the distance a, an essentially T-shaped fitting 26 is installed in the pressure pipe 24, which fitting is shown in detail in FIG. 1A. The leg 28 of the T-shaped fitting 26 branching off vertically from the pressure pipe 24 contains a melting plug 22. An indicated vent pipe 36 receives discharging gas when the melting plug 22 has melted.

The pressure pipe 24 extends over a further third of the length a of the pressure vessel 10. The pressure pipe 24 is terminated by a further T-shaped fitting 26, which is closed off in at least one leg with a melting plug 22.

If a local heating, in particular fire, then occurs in the middle area of the pressure vessel 10, at least one of the melting plugs 22 arranged on the pressure pipe 24 melts, and the pressure vessel 10 can empty.

In FIG. 1, two further pressure vessels with a protective device are indicated. The pressure pipes 24 of all the pressure vessels 10 communicate. In the event of damage, the gas of all pressure vessels 10 can flow off through a discharge opening released by the liquefied metal of at least one melting plug 22.

In a normal emptying of the pressure vessels 10, the gas flows off via a common outflow line 16 for further use.

FIG. 2 shows a melting plug 22 known per se, incorporated inside a steel or brass sleeve 30 with external thread 32 and hexagonal screw head 34.

In FIG. 3, the cylindrical pressure vessel 10 is represented in perspective. On both sides there are arranged valves 18, via which an annular pressure pipe 24 is conductively connected. Furthermore, the principle of the venting system is shown. A vent pipe 36 adjoins the melting plugs 22 in the valves 18 and the T-shaped fittings 26. The vent pipes 36 open out into a common pipe 38, which leads into the area outside the pressure vessel, for example onto the roof of a tube trailer. It is thus ensured that combustible gas occurring in the event of local heating does not further increase the damage.

For the sake of simplicity, in FIG. 3 only one T-shaped fitting with vent pipe 36 is drawn. In reality, the pressure pipe 24 has such a T-shaped fitting 26 with a vent pipe 36 every approx. 1.5 m.

According to a further variant, not represented in FIG. 3, the vent pipes 36 may be led individually out of the danger area.

Figure 4:
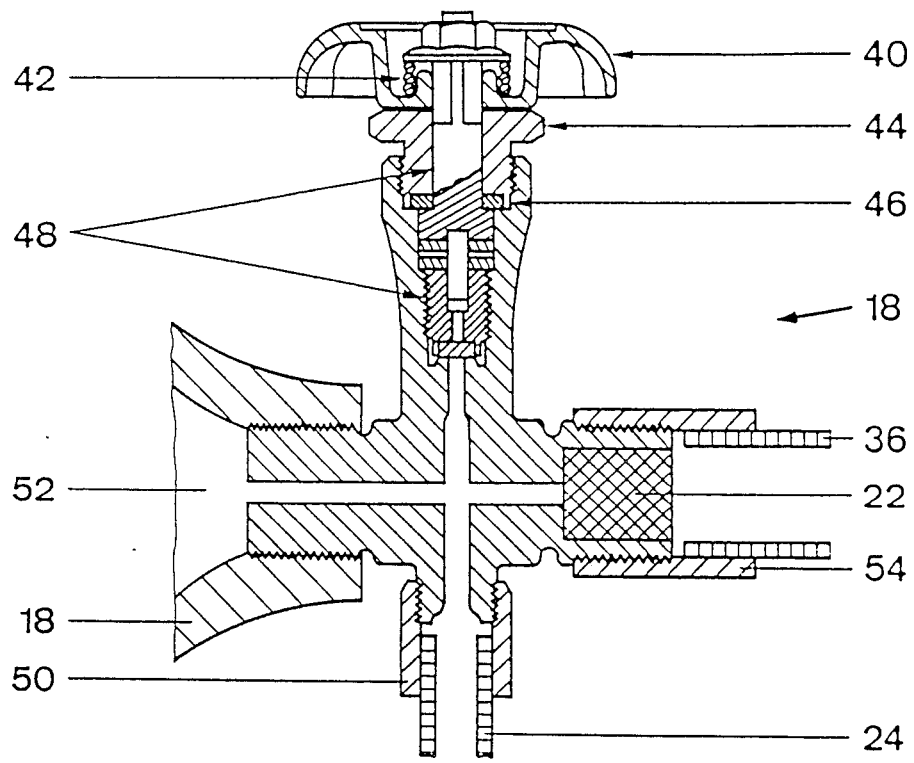
FIG. 4 shows a section through a valve.

FIG. 4 shows a valve 18 which is screwed into an end cap of a pressure vessel. Valve 18 comprises the components regulating a normal emptying, designed in a way known per se, such as a handwheel 40, a spring 42, a cap 44, a seal 46 and an arrangement 48 for pressure reduction.

From the valve, the pressure pipe 24, fastened with a union sleeve 50, branches off. The fact essential for the invention that the interior 52 communicates constantly with the pressure pipe 24 can be seen well in FIG. 4.

Furthermore, a melting plug 22 is a component part of the valve 18. With a union sleeve 54, a vent pipe 36 is attached.

In the event of the temperature increasing above 100° C. in the area of the valve, the melting plug 22 melts. The gas stored in the interior 52 of the pressure vessel can flow directly into a vent pipe 36 and is brought outside the danger area.

For the sake of simplicity, the outflow line (16 in FIG. 1) for the normal emptying of the interior 52 of the pressure vessel 10 is not drawn since it is self-evident to a person skilled in the art.

Figure 5:
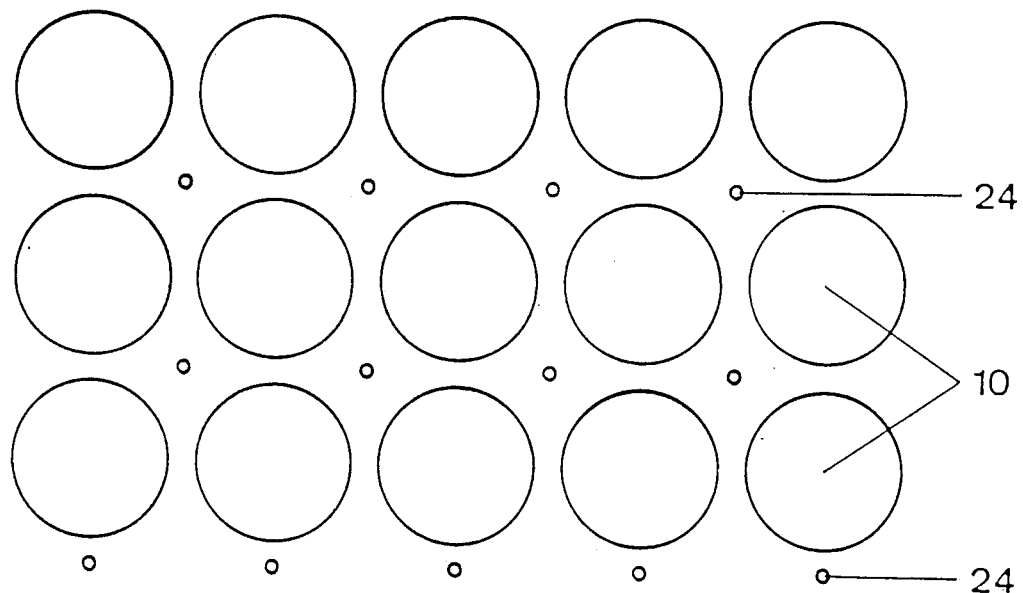
FIG. 5 shows a cross-section through a battery of cylindrical pressure vessels with pressure lines.

FIG. 5 shows the principle of a battery of pressure vessels 10, for example on a tube trailer, with pressure pipes 24. In the lowest layer of pressure vessels 10, the pressure pipes 24 are arranged directly underneath the pressure vessels 10. They may, however, also run in between. Above the bottom layer of pressure vessels 10, the pressure lines 24 are in each case arranged in the intermediate spaces. All pressure lines 24 shown communicate. In principle, in the event of fire damage, all pressure vessels 10 could be emptied via a single opening.

A battery of said pressure vessels with said protected device can be mounted on any natural gas vehicle, such as a transit bus, a truck or especially a tube trailer.

What is claimed is:

1. In an apparatus for containing high-pressure gas and comprising at least one substantially cylindrical pressure vessel with an axial length of at least 1.5 m, said vessel having at least one end cap; an improved protection device which comprises a pressure pipe which leads from said one end cap, always communicates with the interior of said vessel, and extends substantially axially along the outside of said vessel, said pressure pipe being provided with at least one vent which is normally closed by at least one melting plug of an alloy which melts at a low temperature; whereby if said at least one plug melts, gas in said vessel may escape via said pressure pipe and wherein at least one said vent comprises a T-shaped fitting fitted between sections of said pressure pipe and a branch thereof providing said vent.

2. A protection device according to claim 1, wherein said vessel has at least one end cap fitted with a further vent closed by a melting plug of an alloy which melts at a low temperature.

3. A protective device according to claim 1, wherein an end of said pressure pipe remote from said end cap forms said vent.

4. A protective device according to claim 1, wherein a plurality of said vents are arranged at intervals of between 1 and 2 m along said pressure pipe.

5. A protective device according to claim 1, wherein said alloy melts in a range of 80 to 120 ° C.

6. A protective device according to claim 1, wherein said pressure pipe forms a closed loop between end caps at opposite ends of said vessel.

7. A protective device according to claim 1, wherein a plurality of said vents lead to a common vent pipe to direct escaping gases away from said vessel or vessels.

8. A protective device according to claim 1, wherein said pressure pipe serves a plurality of said vessels.

9. A protective device according to claim 1, wherein there is an individual one of said vessels and said pressure pipe is arranged beneath said vessel.

10. A protective device according to claim 1, wherein there is a battery of said pressure vessels and a plurality of said pressure pipes are arranged between said vessels.

11. A protective device according to claim 1, wherein said pressure pipes and said vents are made of a material taken from the group consisting of steel and/or copper.

12. A protective device according to claim 1, wherein said pressure vessel is of aluminium.

13. A protective device according to claim 12 wherein said aluminium vessel has a fibre-reinforced jacketing.

14. In an apparatus for containing high-pressure gas and comprising at least one substantially cylindrical pressure vessel with an axial length of at least 1.5 m, said vessel having at least one end cap; an improved protection device which comprises a pressure pipe which leads from said one end cap, always communicates with the interior of said vessel, and extends substantially axially along the outside of said vessel, said pressure pipe being provided with at least one vent which is normally closed by at least one melting plug of an alloy which melts at a low temperature; whereby if said at least one plug melts, gas in said vessel may escape via said pressure pipe and wherein all said pressure pipes of a battery of said vessels are mutually interconnected.

15. In an apparatus for containing high-pressure gas and comprising at least one substantially cylindrical pressure vessel with an axial length of at least 1.5 m, said vessel having at least one end cap; an improved protection device which comprises a pressure pipe which leads from said one end cap, always communicates with the interior of said vessel, and extends substantially axially along the outside of said vessel, said pressure pipe being provided with at least one vent which is normally closed by at least one melting plug of an alloy which melts at a low temperature; whereby if said at least one plug melts, gas in said vessel may escape via said pressure pipe and wherein a battery of said pressure vessels is mounted on a tube trailer.

* * * * *